United States Patent
Travis et al.

(10) Patent No.: US 8,174,380 B2
(45) Date of Patent: May 8, 2012

(54) ELECTRONIC DEVICE DOCK WITH REPLICATING STATUS INDICATOR

(75) Inventors: Ward C. Travis, Palo Alto, CA (US);
Stanley Rabu, Sunnyvale, CA (US);
Terry Tikalsky, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 512 days.

(21) Appl. No.: 12/485,903

(22) Filed: Jun. 16, 2009

(65) Prior Publication Data
US 2010/0315210 A1 Dec. 16, 2010

(51) Int. Cl.
*G08B 1/08* (2006.01)
*H04M 11/04* (2006.01)
*G06F 1/16* (2006.01)
*H05K 5/00* (2006.01)

(52) U.S. Cl. .................. 340/538; 340/538.17; 340/635; 340/657; 340/12.32; 340/815.4; 340/815.45; 361/679.41; 361/679.45; 710/304; 710/305; 455/424

(58) Field of Classification Search .................. 340/538, 340/815.4, 815.5; 361/679.41, 679.45
See application file for complete search history.

(56) References Cited

U.S. PATENT DOCUMENTS

| | | | |
|---|---|---|---|
| 6,102,284 A | 8/2000 | Myers et al. | |
| 6,246,577 B1 | 6/2001 | Han et al. | |
| 7,532,461 B2 * | 5/2009 | Krancher et al. | 361/679.41 |
| 2006/0286840 A1 | 12/2006 | Freeman et al. | |

* cited by examiner

*Primary Examiner* — Donnie Crosland
(74) *Attorney, Agent, or Firm* — Treyz Law Group; G. Victor Treyz; David C. Kellogg

(57) ABSTRACT

An adapter may couple an electronic device to a host such as a computer. When coupled in this way, the host may transfer media files to the device. The host may also supply power to the electronic device using power lines in the adapter. The electronic device may have a status indicator such as a light-emitting diode status indicator. The adapter may also have a status indicator. During operation, the electronic device may transmit coded information on the current state of the status indicator in the electronic device by modulating the status indicator or other load in the device at a selected frequency. Control circuitry in the adapter may detect the transmitted state information by monitoring the power lines. The control circuitry may control the status indicator in the adapter so that the status indicator in the adapter replicates the current state of the status indicator in the electronic device.

31 Claims, 10 Drawing Sheets

| 65 Hz | SOLID AMBER |
|---|---|
| 75 Hz | SOLID GREEN |
| 85 Hz | SOLID RED |
| 65 Hz ON/OFF @ 0.5 Hz | BLINKING AMBER |

FIG. 6

ELECTRONIC DEVICE DOCK WITH REPLICATING STATUS INDICATOR

BACKGROUND

Electronic devices such as portable media players and cellular telephones with media playback capabilities typically contain audio jacks. Accessories such as headsets have mating plugs. A user who desires to use a headset with an electronic device may connect the headset to the electronic device by inserting the headset plug into the mating audio jack on the electronic device. Miniature size (3.5 mm) phone jacks and plugs are commonly used in electronic devices such as portable media players and cellular telephones, because audio connectors such as these are relatively compact.

It is often desirable to connect electronic devices such as these to a personal computer. When this type of arrangement is used, media files from the personal computer can be loaded onto the electronic device and power can be supplied to the electronic device to recharge its battery.

A stand-alone cable or a cable that is part of a dock accessory can be used as an adapter to connect an electronic device to a personal computer. One end of the adapter is typically provided with a universal serial bus (USB) connector to plug into the computer. The cable or dock also has a corresponding connector that plugs into the electronic device. The connector that plugs into the device is often a specialized multi-pin power and data connector.

Specialized connectors such as the widely used 30-pin connector on some of the media player and cellular telephone products of Apple Inc. of Cupertino, Calif. consume a relatively large amount of volume in an electronic device. It may therefore be desirable to omit these connectors to save space or to enhance device aesthetics. In a device in which a 30-pin data connector is not available, the audio plug may be temporarily used in connecting the device to the personal computer. With this type of arrangement, an adapter cable may have a USB connector on one end to plug into a personal computer and may have an audio plug on the other end to plug into the audio jack of the electronic device.

Adapters with audio-plug-to-USB capabilities may be helpful in coupling personal computers to electronic devices that have only audio jack ports. Care should be taken, however, to retain desired levels of functionality when using such an adapter. It would be desirable, for example, to avoid situations in which the use of the adapter interferes with a user's ability to obtain status indicator information.

SUMMARY

Electronic devices such as cellular telephones and media players may be provided with audio connectors. During normal operation, an accessory such as a headset may be plugged into the audio connector on an electronic device. When it is desired to transfer files to the electronic device from a host computer or when it is desired to recharge a battery in the electronic device using power from the host computer, an adapter may be used.

The adapter may have a data port connector such as a universal serial bus connector that plugs into the host computer. The adapter may also have a connector that mates with a connector in the electronic device. For example, the adapter may have a cable or dock structure with an audio connector that mates with the audio connector in the electronic device. The audio connector in the adapter may be a four-contact audio plug that protrudes vertically from a planar surface of a dock housing. Power lines in the adapter may be used to route power from the host to the electronic device.

The electronic device may have a status indicator such as a light-emitting diode status indicator. The status indicator may be controlled by the device to display status information for a user. The status information may include, for example, media playback information, information on power functions, data synchronization status information, or other information on the status of the device. With one suitable arrangement, the status indicator may display different colors of light to represent different states of operation.

The status indicator may be blocked from view when the electronic device is mounted to the adapter (e.g., when an end face of the device rests against the planar dock housing surface). Accordingly, the adapter may be provided with its own status indicator. The adapter may use its status indicator to replicate the information being displayed by the status indicator of the electronic device. This allows the user to monitor how the device is operating even if the device's status indicator is difficult or impossible to view due to the presence of the adapter.

When the electronic device is coupled to the adapter, the electronic device may impose a signal on the power lines in the adapter that represents the current state of the status indicator in the electronic device. The coded power line information may be based, for example, on a predetermined set of alternating-current code frequencies. With this type of arrangement, a first frequency may represent a first state for the status indicator (e.g., a first color) and a second frequency may represent a second state for the status indicator (e.g., a second color). Additional code frequencies and patterns of frequencies may be used if desired.

The electronic device may transmit status indicator state information to the adapter by modulating the power consumed by the status indicator or other load at a frequency that matches one of the predetermined code frequencies. If, for example, the device's status indicator is currently displaying a red light, the electronic device can inform the adapter of this condition by driving the status indicator at a particular frequency. This imposes a corresponding alternating-current ripple on the power line that can be detected by the adapter.

The adapter may detect transmitted status indicator state information from the electronic device by monitoring the power lines. Digital signal processing techniques or analog filtering techniques may be used to measure the presence or absence of a transmitted signal at each of a number of predetermined frequencies. When a frequency component at a particular frequency is detected, the control circuitry of the adapter may control its status indicator accordingly to replicate the state of the status indicator on the electronic device.

Further features of the invention, its nature and various advantages will be more apparent from the accompanying drawings and the following detailed description of the preferred embodiments.

BRIEF DESCRIPTION OF THE DRAWINGS

FIG. 6 is a table showing an illustrative coding scheme that may be used in conveying status information from an electronic device to an adapter over power line paths in accordance with an embodiment of the present invention.

DETAILED DESCRIPTION

Media players and electronic devices such as cellular telephones that contain media player functionality may be used to play media content for users. Typical electronic devices of this type include audio jacks into which headsets may be plugged.

Audio jacks and mating audio plugs can be provided in a variety of form factors. For example, audio jacks and plugs can have different sizes (e.g., ¼", ⅛" or 3.5 mm, etc.). Audio jacks and plugs can also have different numbers of contacts. For example, audio connectors such as these may have two contacts for audio and ground or may have three contacts to support left and right stereo audio signals and ground. Some audio connector arrangements use four or more audio connectors. For example, a four-contact connector may have left and right audio contacts, a microphone contact, and a ground contact.

A typical three-pin audio connector has a tip contact, a ring contact, and a sleeve contact and is therefore sometimes referred to as a tip-ring-sleeve (TRS). A four-pin audio connectors may have a tip, two rings, and a sleeve. Four-pin audio connectors are therefore sometimes referred to as tip-ring-ring-sleeve (TRRS) connectors.

Figure 1:
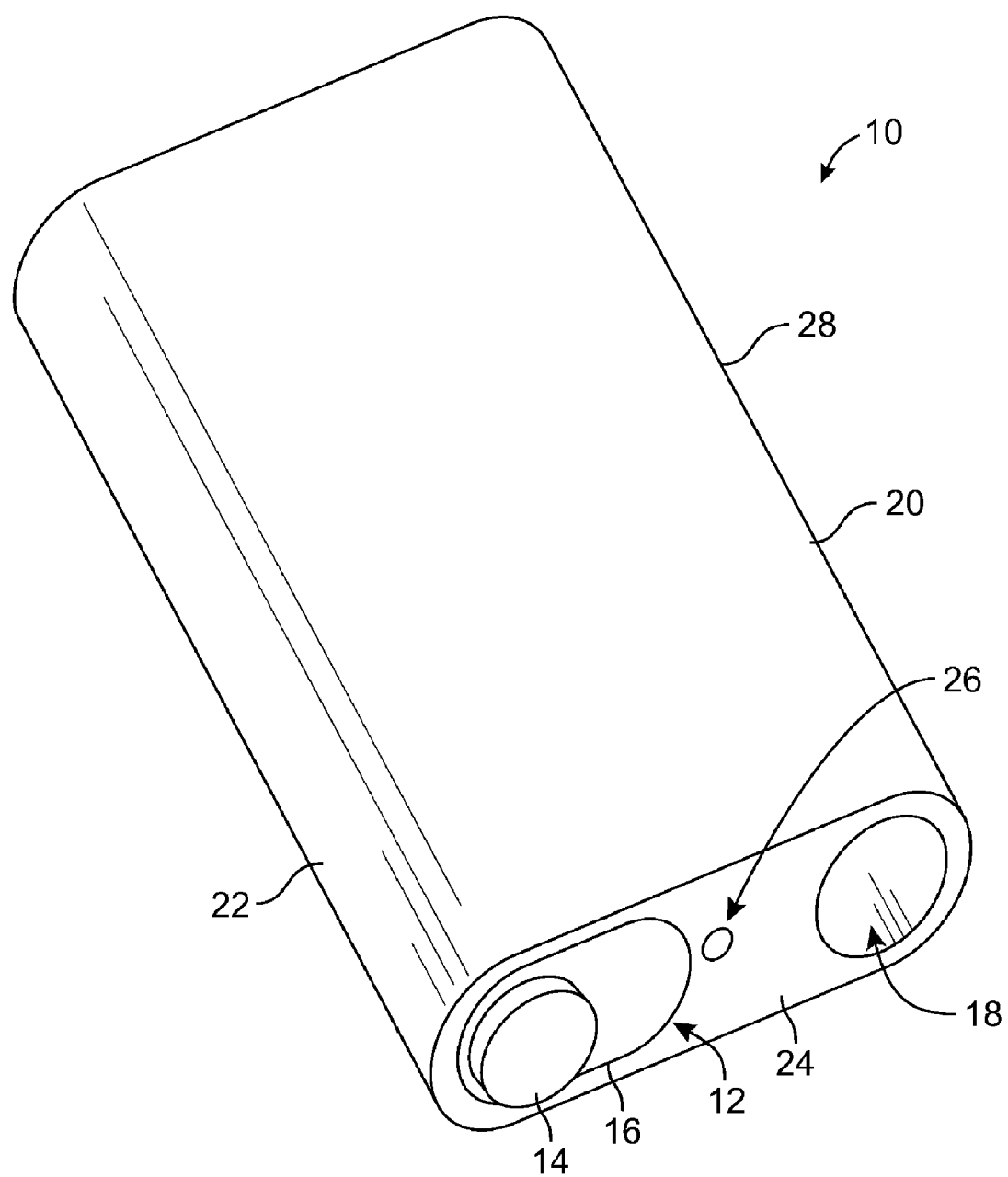
FIG. 1 is a perspective view of an illustrative electronic device that may have a status indicator in accordance with an embodiment of the present invention.

An illustrative electronic device that has an audio connector is shown in FIG. 1. Device 10 may be a media player, a cellular telephone player with media player capabilities, a portable electronic device such as a computer, a smaller portable electronic device such as a pendant or wrist device, or any other suitable electronic device.

The functions of device 10 may be implemented using storage and processing circuitry. Storage in the storage and processing circuitry may include volatile and non-volatile memory and may be provided using stand-alone memory chips, memory that is incorporated into a processor, application-specific integrated circuit, or other component, solid state memory devices, hard drives, or other suitable storage components. Processing circuitry in the storage and processing circuitry may be implemented using one or more processors. Examples of integrated circuits that may be used in providing processing capabilities for device 10 include microprocessors, microcontrollers, digital signal processors, audio and video chips (codecs), application-specific integrated circuits, communications circuits, etc.

A rechargeable battery may be used to supply device 10 with power when device 10 is not plugged into an alternate power source.

As shown in FIG. 1, electronic device 10 may have a housing 28. Housing 28 may have any suitable shape. In the example of FIG. 1, device 10 has planar front and rear housing surfaces such as front planar surface 20, left and right rounded side walls such as side wall 22, and upper and lower end faces such as lower end face 24.

Device 10 may be provided with input-output devices such as buttons, touch sensitive components, displays, speakers, microphone ports, status indicator lights, analog and digital input-output ports, keypads, keyboards, wireless communications devices such as radio-frequency transceiver circuits, sensors, infrared transmitters, etc. Input-output devices such as these may serve as user input devices for gathering user input from a user of device 10. Some of these devices may also be used in supplying output to the user.

Particularly in portable devices such as the illustrative device shown in FIG. 1, it is not desirable to include every possible input-output component in the device. Some possible input-output devices may therefore be omitted.

In the example of FIG. 1, device 10 has switch 12, audio jack 18, and status indicator 26. Switch 12 may have a switch member 14 that reciprocates between two, three, or more different positions within housing opening 16 in housing end face 24. Audio jack 18 may be a 3.5 mm four-contact female audio connector (as an example). Status indicator 26 may be a light that can be placed in various solid or flashing states to display status information to the user. For example, status indicator light 26 may be directed to emit solid red light, solid green light, solid amber light, or flashing amber light (as an example). One or more light-emitting diodes may be used to provide light for status indicator light 26. For example, a red light-emitting diode and a green light-emitting diode may be mounted adjacent to one another behind a transparent window in end face 24. When the red light-emitting diode is activated and the green light-emitting diode is turned off, right light will be emitted. Green light will be emitted when the red light-emitting diode is off and the green light-emitting diode is on. Amber light may be produced by simultaneously activating both the green and red light-emitting diodes.

Status indicators such as status indicator 26 may be used to convey any suitable information to a user such as information regarding the operating status of device 10. Examples of status information that may be conveyed to a user include status indicators related to media playback functions (e.g., play, pause, stop, rewind, etc.), power functions (low battery, battery fully charged, charging operations are active or inactive, device is on or off, etc.), functions related to syncing the content of device 10 with a host (e.g., by blinking to indicate that synching operations are being performed), etc. Although the status indicator shown in the example of FIG. 1 has a single indicator light, status indicators may, in general, have any suitable number of lights (e.g., one light, two lights, three or more lights, bar-type lights with multiple segments, etc.). Status information may be conveyed to the user with monochromatic lights or lights that can be adjusted to produce two, three, or more than three colors. If desired, the intensity of the light may be changed (e.g., from a low level to a high level) to convey information to the user. Information may also be conveyed by using different illumination patterns (solid, blinking, blinking with different patterns and/or rates, etc.).

A status indicator in device 10 may produce sound. For example, a speaker may be used to provide a beeping tone or other audible output that conveys status indicator information. Audible and visible status indicator output may be combined (e.g., by providing a status indicator tone in conjunction with a flashing light output). Other types of status indicator output (e.g., vibration, temperature, etc.) may be used if desired. Moreover, combinations of these approaches may also be used. The illustrative configuration of device 10 that is shown in FIG. 1 uses only a status indicator light, but this is merely an example. Any suitable status indicator may be used in device 10 if desired (e.g., a visual status indicator, an audible status indicator, a vibrating status indicator, an indicator that moves in other ways to convey status information, etc.).

Figure 2:
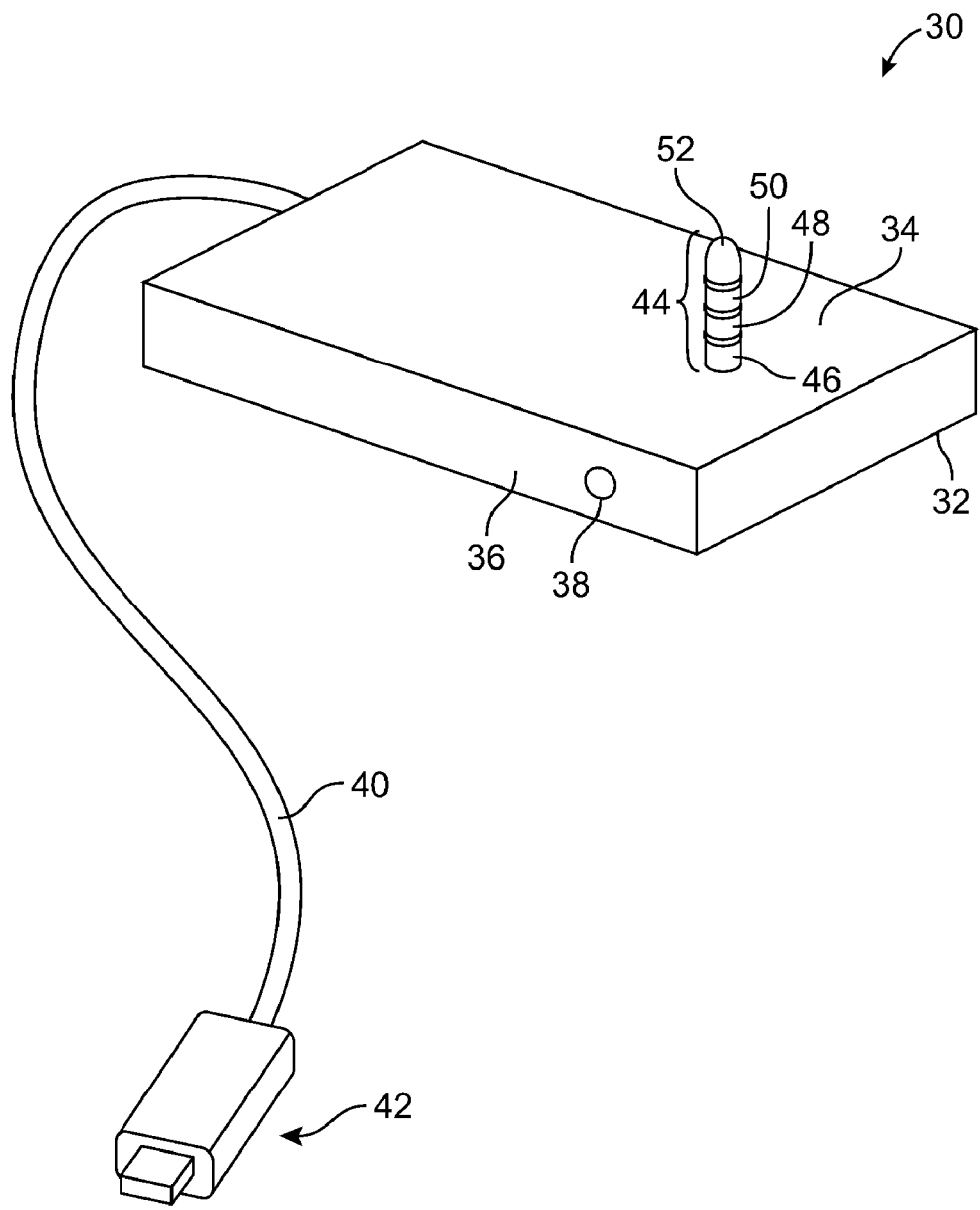
FIG. 2 is a perspective view of an illustrative dock with a replicating status indicator that may serve as an adapter to couple an electronic device of the type shown in FIG. 1 to a host such as a personal computer in accordance with an embodiment of the present invention.

An illustrative adapter that may be used to connect device 10 of FIG. 1 to a host such as a personal computer is shown in FIG. 2. The illustrative adapter of FIG. 2 is a dock accessory. If desired, other types of adapters may be used to connect device 10 to a host (e.g., stand-alone cables, accessories with speakers, etc.). The use of a dock adapter is merely an example.

As shown in FIG. 2, dock 30 may have a housing such as housing 32. Housing 32 may have any suitable shape. In the example of FIG. 2, housing 32 has a planar upper surface 34. Audio plug 44 may protrude vertically in an upwards direction from surface 34. Audio plug 44 may be a male four-contact audio connector having tip contact 52, ring contacts 48 and 50, and sleeve contact 46. A status indicator such as status indicator 38 may be mounted on side wall 36 or other suitable portion of housing 32.

Dock 30 may have a cable such as cable 40 and a data port connector such as universal serial bus (USB) connector 42. When it is desired to connect device 10 (FIG. 1) to a host such as a personal computer, USB plug 42 may be inserted into a corresponding USB jack in the host. Circuitry in housing 32 may be used to electrically connect plug 42 to the contacts of audio connector 44. Cable 40 may have any suitable number of conductive lines. For example, cable 40 may have a positive power line, a ground power line, and two data lines that are used for conveying USB data. In this type of configuration, each of the four conductive lines in cable 40 may be coupled to a respective one of the four contacts in audio connector 44.

Figure 3:
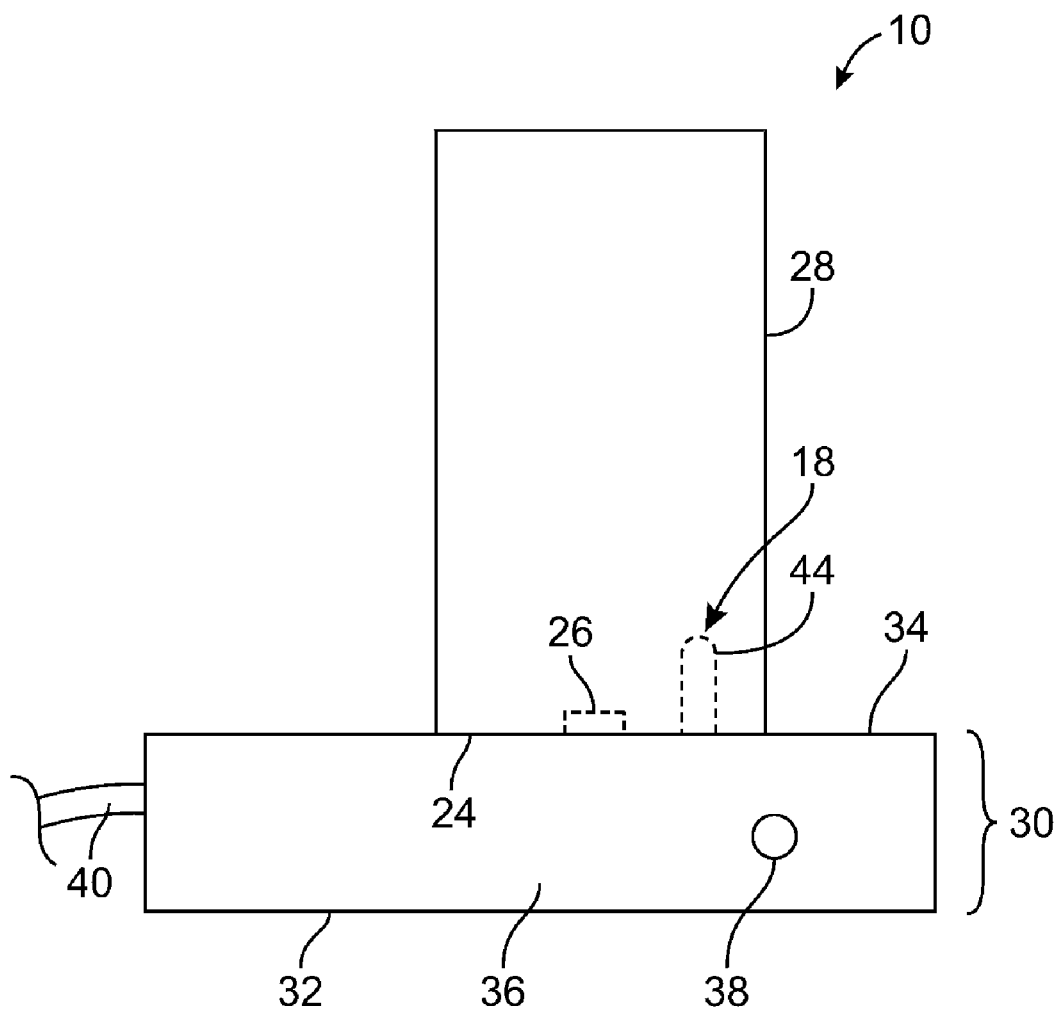
FIG. 3 is a side view of an illustrative electronic device of the type shown in FIG. 1 connected to an illustrative adapter of the type shown in FIG. 2 in accordance with an embodiment of the present invention.

As shown in FIG. 3, when device 10 is attached to dock 30, audio connector 44 of FIG. 2 mates with audio connector 18 of FIG. 1, thereby electrically connecting device 10 to dock 30. Cable 40 (FIG. 2) connects dock 30 to a USB port or other suitable port in the host device.

With this type of arrangement, end face 24 of device 10 rests against planar upper surface 34 of dock housing 32 when device 10 is docked. As a result, status indicator 26 is hidden from view. Because the user cannot see the light being emitted from indicator 26, the user is unable to receive status information directly from status indicator 26. Blocking the status indicator in this way could potentially interfere with the user's ability to use device 10.

To make up for the inability of the user to properly receive status information from indicator 26 while device 10 is in its docked position within dock 30, dock 30 may display the status information using status indicator 38. Whenever device 10 and dock 30 are connected to each other, device 10 may send dock 30 information on the current state of status indicator 26. This information may, for example, be conveyed over power lines in the path between device 10 and dock 30. Dock 30 may use this state information to replicate the blocked status information using status indicator 38.

Consider, as an example, a situation in which status indicator 26 on device 10 is producing a solid output of a given color. The user of device 10 may desire to connect device 10 to dock 30 to recharge the battery in device 10 or to sync device 10 to a library on the host.

When device 10 is connected to dock 30, status indicator 26 will face downwards (in the FIG. 3 example) and will be blocked by planar surface 34. Because no light from status indicator 26 can be viewed by the user, status indicator 26 cannot be used to convey status information to the user.

Accordingly, the state of status indicator 26 may be replicated by dock 30 by placing status indicator 38 in the same state as indicator light 26. When this is done, the same solid output of the given color that would have been visible to the user at the output of status indicator 26 on device 10 will instead be viewable to the user as the output of status indicator 38. Other types of status indicator information can likewise be replicated. For example, if a speaker that was being used as a status indicator becomes blocked when an electronic device is connected to an adapter, a speaker on the adapter may be used to reproduce the blocked audio status information.

If desired, dock 30 can display additional status information using status indicator 38. For example, the fact that device 10 is currently docked on dock 30 may be confirmed by generating a status light with status indicator 36 or other suitable status indicator device. Dock 30 can also modify the status information (e.g., by displaying a red light instead of a green light or by displaying a flashing light instead of a solid light). An advantage of displaying status information with status indicator 38 in the same way that this information would normally be displayed using status indicator 26 is that this reduces the number of different status indicator schemes to be learned by the user. Arrangements in which the status information from the device status indicator(s) are replicated exactly on corresponding dock status indicator(s) are, however, merely illustrative. The status indicator information that is conveyed from device 10 may be displayed somewhat differently on dock 30 or status information that is not normally displayed using device status indicator 26 may be displayed using dock status indicators such as status indicator 38 if desired.

Any suitable scheme may be used for conveying information from electronic device 10 to dock 30. For example, information may be conveyed wirelessly using radio-frequency signals or light. Information may also be conveyed over an analog or digital data path. For example, mating serial bus or parallel bus connectors can be used to interconnect respective data communications circuits in device 10 and dock 30.

To minimize the number of connectors that are used, it may be advantageous to convey status information between device 10 and dock 30 using an arrangement that takes advantage of the audio connectors that are already present (i.e., female audio connector 18 in device 10 and male audio connector 44 in device 30 or other suitable mating audio connectors). In a typical adapter arrangement that is based on a USB cable (e.g., cable 40 of FIG. 2), there are two power lines (e.g., a positive power supply line and a ground) and two signal lines (e.g., a positive data line DP and a negative data line DN) available to convey data. The data lines can be used to convey data if desired, but to ensure compatibility with the standards that have been promulgated by the USB standards bodies, it may be preferable to convey the status information over the positive and ground power lines, rather than to modulate the data lines in a way that might be considered to not be standards compliant.

Information may be conveyed over the power lines by imposing data signals in the form of an alternating current (AC) signal on top of the existing direct current (DC) power supply voltage. For example, the power supply lines may be used to convey a 5 volt positive power supply voltage and a 0 volt ground voltage to two respective contacts in the audio connectors. Device 10 can convey information on the current state of status indicator 26 to dock 30 by imposing an AC signal on the 5 volt DC power supply voltage.

At dock 30, an AC signal that has been transmitted from device 10 can be extracted and processed. If the AC signal indicates, for example, that the current state of status indicator 26 is "solid red," dock 30 can place status indicator 38 in a "solid red" state.

Any suitable coding scheme may be used when conveying status information from device 10 to dock 30. For example, modulation schemes such as frequency modulation (FM) schemes, amplitude modulation (AM) schemes, pulse-code modulation (PCM) schemes, code-division-multiple-access (CDMA) schemes, and phase-shift keying (PSK) schemes may be used. With one suitable arrangement, which is sometimes described herein as an example, an amplitude shift keying (ASK) modulation scheme may be used to convey status information. In particular, the presence or absence of different AC frequencies (tones) may be used to represent different corresponding states of status indicator 26. A first tone may, for example, represent a first color for status indicator 26, whereas a second tone may represent a second color for status indicator 26. When dock 30 detects the first tone on the power lines, dock 30 can place status indicator 38 in the first color state. When dock 30 detects the second tone, status indicator 38 can be placed in the second color state.

The tones that are used in conveying the status information from device 10 to dock 30 may be generated as part of a dedicated communications operation or may be generated during the process of operating status indicator 26. For example, tones may be imposed onto the power line path in cable 40 by modulating the light-emitting diodes in status indicator 26 and thereby modulating the power drawn by device 10.

Figure 4:
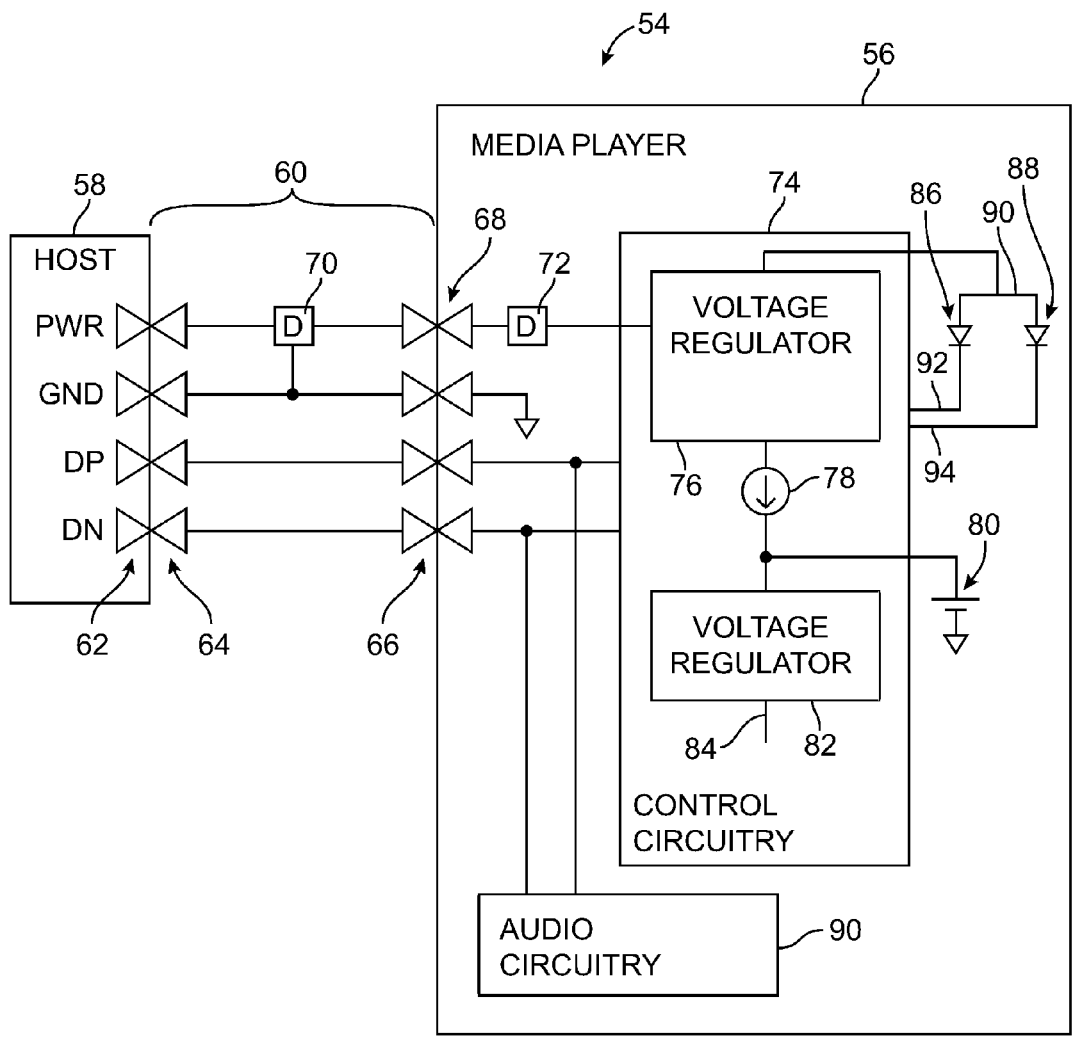
FIG. 4 is a schematic diagram showing how a conventional adapter may be used in connecting a media player to a personal computer host.

A conventional system in which an adapter cable is used to couple a media player with a status indicator to a personal computer host is shown in FIG. 4. As shown in FIG. 4, personal computer host 58 in system 54 may be coupled to media player 56 using adapter cable 60. Cable 60 has a USB connector 64 with four pins that mate with four corresponding USB pins in USB port 62 in host 58. Cable 60 also has a four-contact audio plug 66 that plugs into four-pin audio jack 68.

Host 58 may supply the positive power supply line PWR in connector 62 with a positive power supply voltage of five volts. Cable 60 may have power line circuit 70 and media player 56 may have corresponding power line circuit 72. When media player 56 is first coupled to host 58, power line circuits 70 and 72 may communicate with each other to determine when it is appropriate to use circuit 70 to release the full to five volt supply from host 58. Before the five volt power supply voltage is released, control circuitry 74 in media player 56 may be powered by battery 80. Voltage regulator 82 may receive power from battery 80 and may produce a corresponding regulated power supply voltage on output 84. Media player 56 can operate using this voltage. When the five volt power supply voltage is released by circuit 70, power for operating media player 56 can be supplied from power supply line PWR and ground GND.

Voltage regulator 76 receives the power supply voltage from power line PWR and produces a corresponding regulated voltage on positive voltage line 90. Current source 78 can recharge battery 80 using power from voltage regulator 76.

Light-emitting diodes 86 and 88 are respective red and green light-emitting diodes that are mounted behind a common status indicator window. Diode 86 is coupled between line 90 and line 92. Diode 88 is coupled between line 90 and line 94. Control circuitry 74 controls the on and off states of diodes 86 and 88 by controlling the voltages on lines 92 and 94.

When not attached to cable 60, audio connector 68 may be attached to a headset. In this mode of operation, audio circuitry 90 can produce left and right channel audio for the headset.

Figure 5:
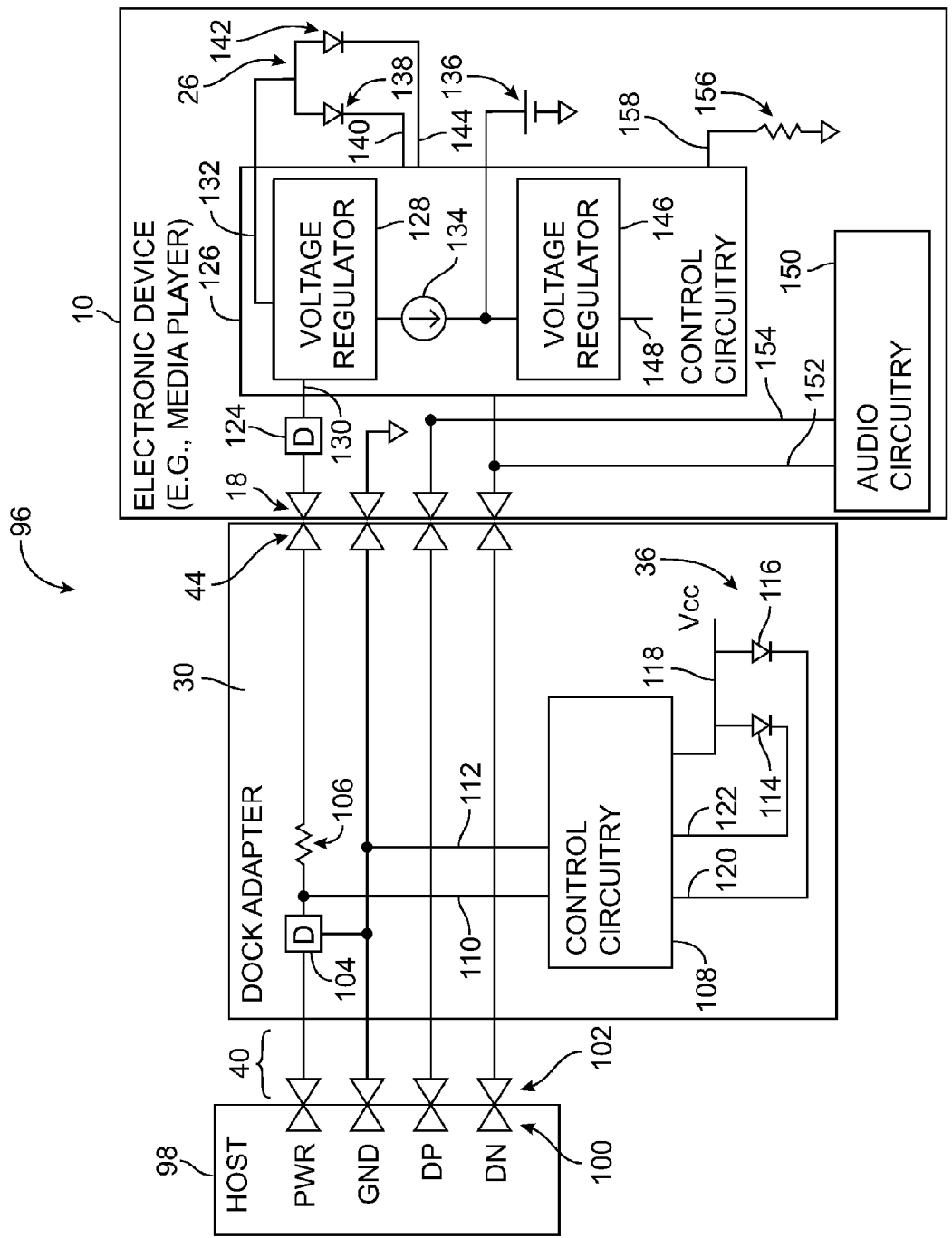
FIG. 5 is a diagram showing how an adapter may be used to connect an electronic device to a host system in accordance with an embodiment of the present invention.

A system in which status light information for device 10 can be replicated using a status indicator associated with a dock or other adapter accessory is shown in FIG. 5. In system 96, personal computer host 98 may be coupled to electronic device 10 (e.g., a media player, cellular telephone, handheld electronic device, etc.) using dock 30. Audio circuitry 150 may provide right and left audio signals to right and left audio contacts in connector 18 when a headset plug is inserted into connector 18.

When it is desired to interface with host 98, the headset plug may be removed from connector 18 and device 10 can be coupled to host 98 using dock 30. Dock 30 has a cable 40. Cable 40 may have a connector such as a USB connector (connector 102) having four pins that mate with four corresponding USB pins in USB port 100 of host 98. If desired, connector 100 in host 98 may be associated with different types of data ports. The use of a USB port for connector 100 is merely illustrative.

Cable 40 may also be coupled to the circuitry of dock 30 and a corresponding four-pin connector such as four-pin audio plug 44. Plug 44 may plug into a corresponding audio jack in electronic device 10 such as four-contact audio connector 18. Plug 44 and jack 18 may be, for example, 3.5 mm (⅛ inch) TRRS connectors.

Host 98 may supply the positive power supply line PWR in connector 100 with a positive power supply voltage of five volts or other suitable power supply voltage (i.e., a DC voltage). Dock 30 may have power line circuit 104. Electronic device 10 may have corresponding power line circuit 124.

When electronic device 10 is coupled to host 98, power line circuits 104 and 124 may communicate with each other to determine when it is appropriate to use circuit 104 to release the positive power supply voltage on power line PWR to device 10.

Control circuitry 126 in device 10 may be powered by battery 136 when power from positive power supply line PWR is not available. Before the positive power supply voltage on terminal PWR is released, voltage regulator 146 may receive power from battery 136 and may produce a corresponding regulated power supply voltage on output 148 for use in powering the circuitry of device 10. When the positive power supply voltage on power line PWR is released by circuit 104, power for operating device 10 can be routed to device 10 using power supply line PWR and ground GND.

Voltage regulator 128 may receive the power supply voltage from power line PWR and may produce a corresponding positive regulated voltage on positive voltage line 132. Current source 134 (which may be considered to be a part of voltage regulator 128) can recharge battery 136 using power from voltage regulator 128.

Status indicator 26 may be based on one or more light-emitting diodes. In the example of FIG. 5, light-emitting diodes 138 and 142 are red and green light-emitting diodes, respectively. Diodes 138 and 142 may be mounted behind a common transparent status indicator window in housing 28 (FIG. 1). Diode 138 is coupled between positive power supply line 132 and line 140, whereas diode 142 is coupled between positive power supply line 132 and line 144. Control circuitry 126 may control diodes 138 and 142 by controlling the voltages on lines 140 and 144. Control circuitry 126 may, for example, drive diodes 138 and 142 according to a pulse width modulation (PWM) scheme in which a high-frequency signal (e.g., a square wave signal at 100 kHz) has its pulse width adjusted up or down to control the amount of power being drawn by diodes 138 and 142.

During operation of voltage regulator 128, the current supplied on path 132 is equal to the current on path 130. As a result, changes in the power being drawn by diodes 138 and 142 result in corresponding changes in the current drawn from power line PWR. This current can, in turn, be converted into a voltage using resistor 106 (e.g., a 0.1 ohm resistor or other suitable size). When the load current in diodes 138 and 142 changes, the voltage detected on lines 110 and 112 by control circuitry 108 will therefore change by a corresponding amount.

The amount of load current that is being drawn by diodes 138 and 142 can be controlled by control circuitry 126. This allows control circuitry 126 to send coded information to dock 30. Different tones or patterns of tones may, for example, be used to represent different states of status indicator 26. These tones may be produced by adjusting the pulse-width modulation (PWM) control signals for diodes 138 and 142 using control circuitry 126.

If desired, control circuitry 126 can modulate the amount of load current in other loads. For example, control circuitry 126 can modulate the voltage on line 158 (e.g., using a general purpose input-output line in a controller chip), thereby modulating the load current in resistor 156. This produces corresponding fluctuations in the amount of power consumed by device 10, as when modulating loads such as the light-emitting diodes of indicator 26.

Dock adapter 30 can detect the transmitted signals from device 10 by receiving and processing the voltages across resistor 106 using control circuitry 108. Control circuitry 108 may include analog filtering circuitry to measure frequency components at various different frequencies or may use more general purpose processing circuitry to implement digital processing algorithms. For example, control circuitry 108 may use code running on storage and processing circuitry and/or dedicated hardware to implement a discrete Fourier transform (DFT) algorithm. As an example, the Goertzel algorithm may be used by control circuitry 108 to determine the components of the received signal at each frequency of interest.

After processing the incoming signal to determine its frequency components and analyzing the frequency components to determine the state of status indicator 26, control circuitry 108 may take appropriate actions. For example, control circuitry 108 can replicate the state of status indicator 26 on status indicator 36. This can be accomplished by controlling light-emitting diodes 114 and 116. Light-emitting diodes 114 and 116 may have the same colors as light-emitting diodes 138 and 142. For example, light-emitting diodes 114 and 116 may be red and green diodes. Light-emitting diode 114 may be coupled between positive power supply line 118 and line 122. Light-emitting diode 116 may be coupled between positive power supply line 118 and line 120. By controlling the voltage on lines 120 and 122, control circuitry 108 can control the operations of diodes 114 and 116. Control circuitry 108 may, for example, turn diodes 114 and 116 on and off so that the visual appearance of status indicator 36 matches the visual appearance of indicator 26. Even if indicator 26 is blocked from view, the user can still ascertain the status of device 10 by observing the state of status indicator 36.

A table illustrating an illustrative coding scheme that may be used in conveying status indicator state information from device 10 to dock 30 is shown in FIG. 6. The illustrative example of FIG. 6 involves four status indicator states (solid amber—where both the red and green light-emitting diodes are turned on, solid green, solid red, and blinking amber) and four corresponding tones that are transmitted on the power path of dock 30 by modulating the drive signal for a load such as the status indicator light-emitting diodes and thereby modulating the amount of power being consumed by device 10. The alternating-current tones that are transmitted by the electronic device to the dock and that serve as power line information on the current state of the status indicator for the dock can have any suitable frequency (e.g., a frequency less than 10,000 Hz, a frequency of less than 1000 Hz, or a frequency of less than 100 Hz. If desired, other tones and patterns of one or more tones may be used. The arrangement of FIG. 6 is merely an example.

Figure 7:
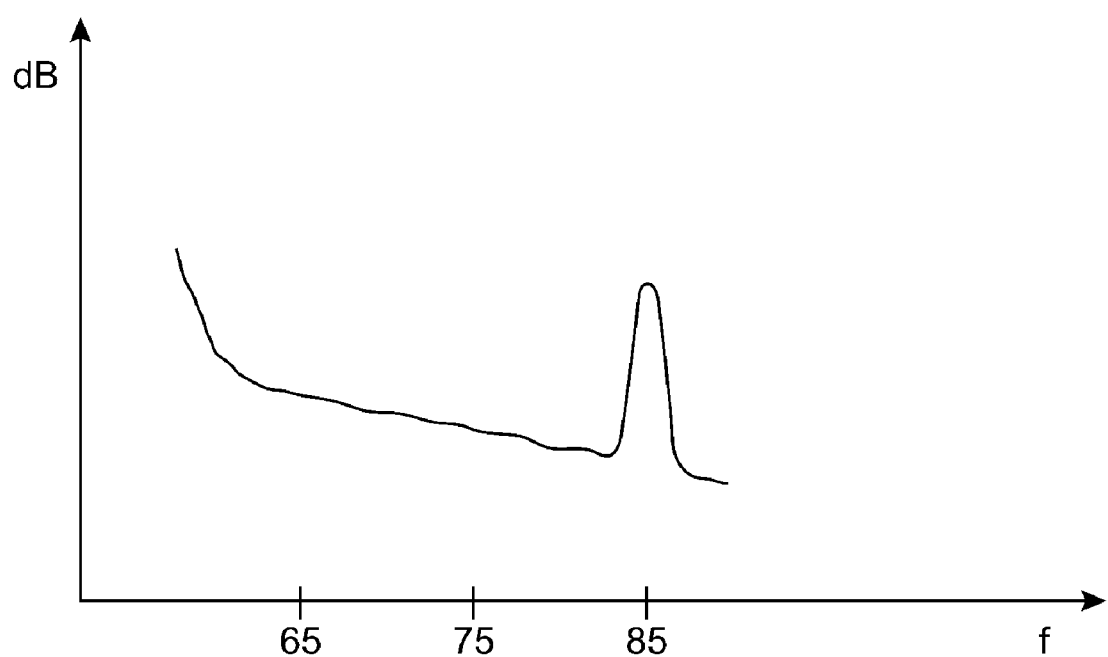
FIG. 7 is a graph showing an illustrative frequency spectrum for a power line signal in an adapter when an electronic device is transmitting a particular status indicator code to the adapter over a power line path in accordance with an embodiment of the present invention.

A frequency spectrum of a typical modulated power path signal is shown in FIG. 7. The graph of FIG. 7 represents the type of spectrum that may be received by control circuitry 108 when monitoring the power path while device 10 is modulating its power consumption at 85 Hz, as evidenced by the peak in received signal intensity at frequencies centered around 85 Hz. As indicated in the table of FIG. 6, device 10 may transmit a power line signal at 85 Hz when the state of status indicator 26 is red. By analyzing the spectrum of FIG. 7, control circuitry 108 can detect this transmitted state information and can replicate the current red state of status indicator light 26 on status indicator light 36.

Figure 8:
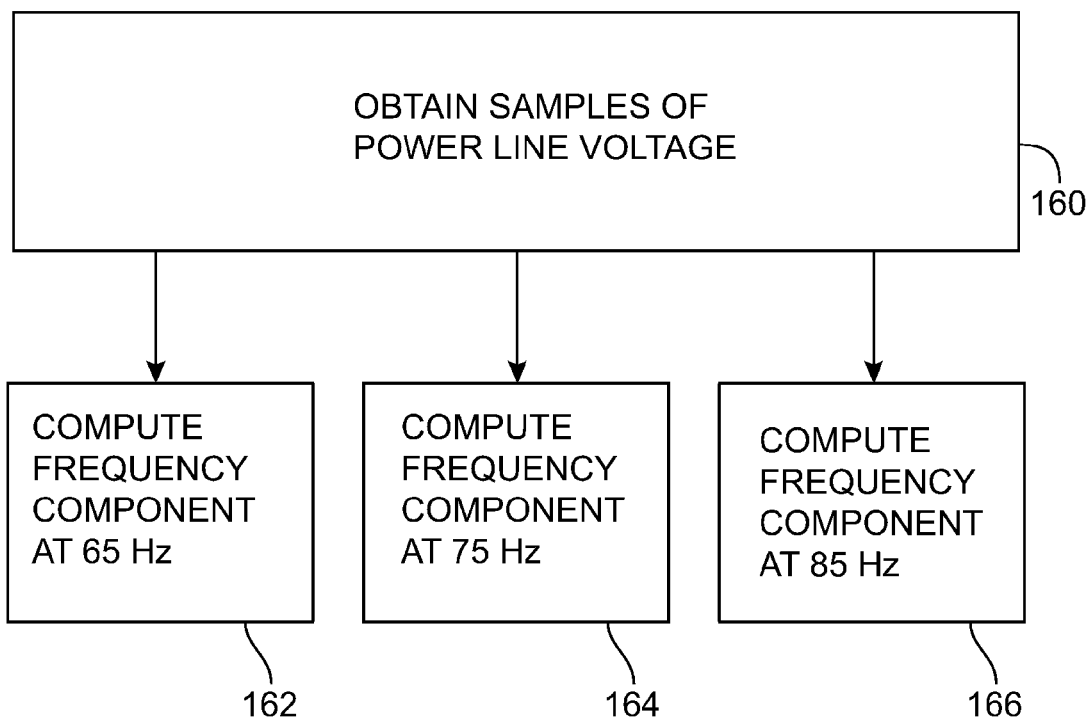
FIG. 8 is a flow chart of illustrative steps involved in measuring the frequency components of a power line signal when an electronic device is transmitting encoded status information to an adapter over a power line path in accordance with an embodiment of the present invention.

A flow chart illustrating how control circuitry 108 may use digital processing techniques to determine how much signal spectrum exits at each of the frequency entries in the code table of FIG. 6 is shown in FIG. 8. At step 160, control circuitry 108 (FIG. 5) may obtain samples of the incoming power line signal. Control circuitry 108 may, for example, use a digital-to-analog converter to sample the positive power supply voltage (i.e., the voltage on power line PWR) relative to the power supply voltage on ground line GND at a series of appropriate sampling times. After the samples have been obtained, computations may be performed on the sampled data (steps 162, 164, and 166). The analysis process may involve Goertzel algorithm computations or other suitable computations that reveal the frequency component of the received signal at each of a number of different predetermined frequencies (i.e., the code frequencies of the table of FIG. 6).

Figure 9:
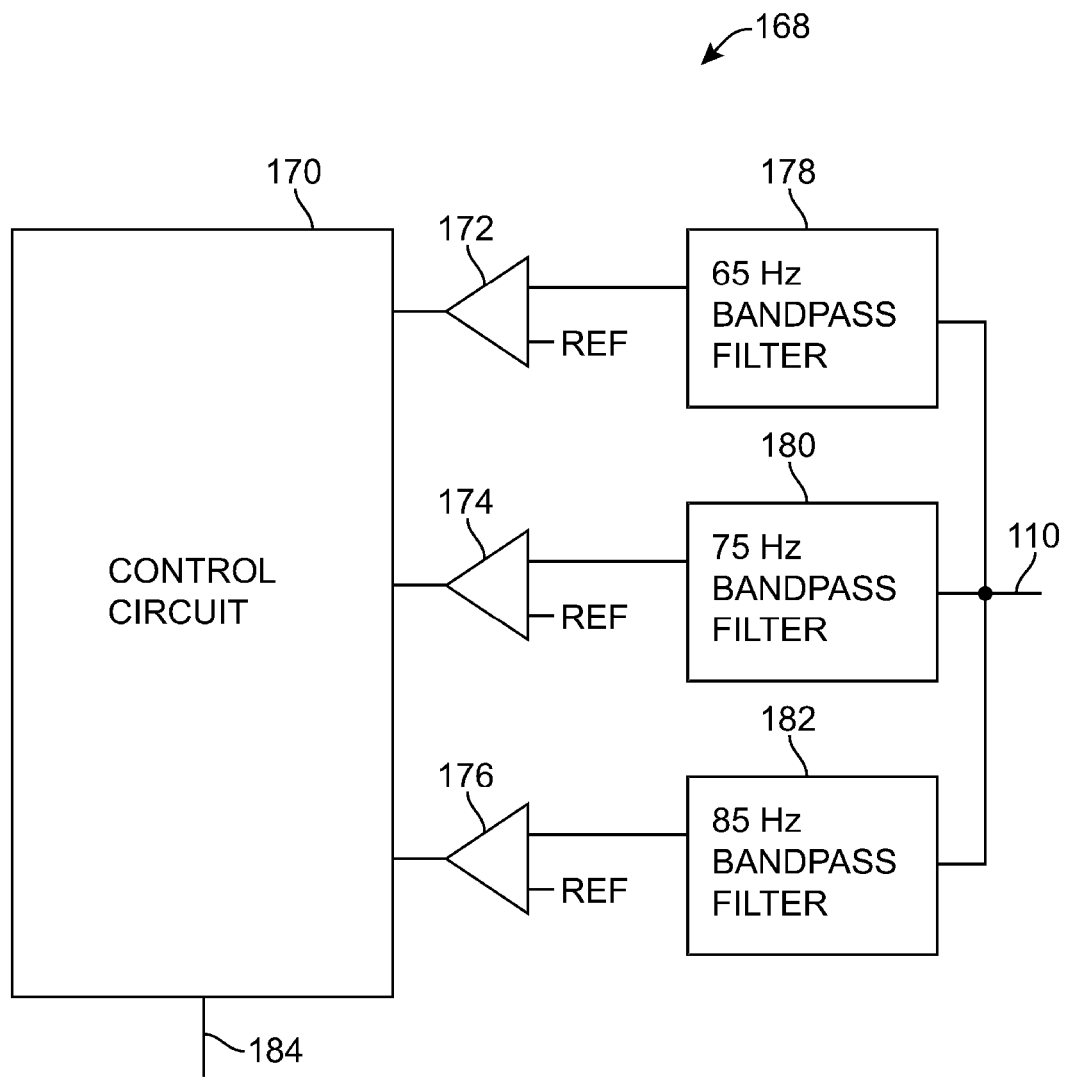
FIG. 9 is a circuit diagram of illustrative filtering circuitry that may be used to make frequency component measurements on power line signals received from an electronic device in an adapter accessory in accordance with an embodiment of the present invention.

An analog filter arrangement may also be used by control circuitry 108. An illustrative analog filter circuit arrangement that may be used by control circuitry 108 in detecting the codes of FIG. 6 is shown in FIG. 9. As shown in FIG. 9, incoming signals from power line PWR may be received by circuitry 168 using path 110. The signals on path 110 may be filtered by respective band-pass filters 178, 180, and 182. Each band-pass filter may produce an output proportional to the relative frequency component at a respective one of the code frequencies of the table of FIG. 6. If, for example, the incoming signal is a tone at 65 Hz, band-pass filter 178 will produce an output signal that is larger than the output signals associated with filters 180 and 182.

Comparators 172, 174, and 176 may be used to compare the outputs of filters 178, 180, and 182 to reference voltages. If a given frequency component is present in the incoming signal, the output of the corresponding comparator will go high. This high output can then be processed by control circuit 170 and a corresponding output control signal may be produce on one or more control lines (path 184). For example, if the incoming signal contains a tone at 75 Hz, the output of comparator 174 will be asserted and control circuit 170 will use control signals on path 184 to direct status indicator light 36 to produce a solid green output.

Figure 10:
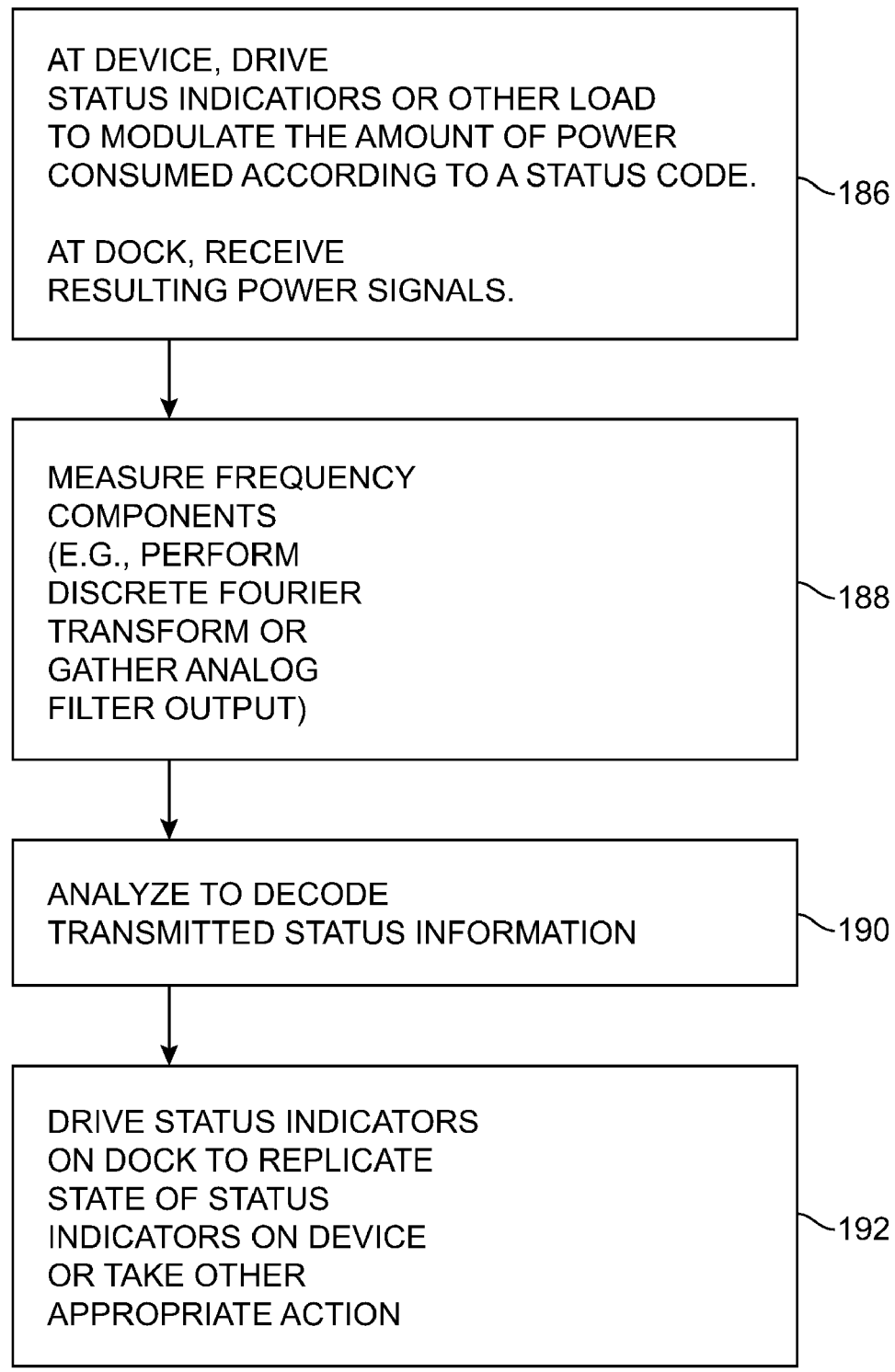
FIG. 10 is a flow chart of illustrative steps involved in transmitting information such as status indicator state information to an adapter from an electronic device over a communications path such as a power line path and receiving this information in the adapter and taking corresponding action in accordance with an embodiment of the present invention.

Illustrative steps involved in conveying information on the state of a status indicator or other component in device 10 to dock 30 and in replicating that status indicator state or taking other appropriate action in dock 30 is shown in FIG. 10.

As device 10 is operating at step 186, device 10 may display status information using status indicator 26. When driving the status indicator load, control circuitry in device 10 may modulate the current of the load according to the codes of the FIG. 6 table or other suitable coding scheme to convey the current state of the status indicator 26 to dock 30. The modulated load current (or other power consumption modulation in device 10) results in a corresponding ripple in the voltage on the positive power supply line in cable 40. This power line signal may be detected by control circuitry 108 in dock 30.

At step 188, dock 30 may measure the frequency components of the received signal at each frequency of interest. For example, if a tone-based coding scheme of the type shown in the table of FIG. 6 is used, control circuitry 108 may measure signal strength at frequencies of 65 Hz, 75 Hz, and 85 Hz. Digital signal processing techniques of the type described in connection with FIG. 8 (e.g., the Goertzel algorithm) or analog filtering techniques (e.g., the analog filtering arrangement described in connection with FIG. 9) may be used during step 188.

After measuring the frequency components of the received signal at each predetermined frequency of interest, dock 30 can use control circuitry 108 to analyze the measured frequency components. If, for example, a 75 Hz tone has been detected, the operations of step 190 may use the table of FIG. 6 to determine that the state of status indicator 26 in device 10 is solid green. In general, any suitable coding scheme may be used. Modulation techniques in which different discrete frequencies correspond to respective discrete states of status indicator 26 may be used, modulation techniques in which different patterns of sequential and/or simultaneous tones correspond to different status indicator states may be used, modulation techniques in which tones are used in conjunction with on/off tone patterns (e.g., at 0.5 Hz or other near-DC frequencies), etc.

At step 192, dock 30 may take appropriate actions based on the results of the analysis of step 190. If, for example, dock 30 concludes from the received power line transmission from device 10 that the status indicator in device 10 is green, dock 30 can replicate the green status indicator state of device 10 using the status indicator in dock 30. Other actions can also be taken. For example, dock 30 may produce a sound using a sound-based input-output device, rather than replicating the same visual appearance of the status indicator of device 10.

The foregoing is merely illustrative of the principles of this invention and various modifications can be made by those skilled in the art without departing from the scope and spirit of the invention.

What is claimed is:

1. An accessory for use with an electronic device that has a status indicator with a state, comprising:
   a power line path that supplies power to the electronic device;
   a status indicator; and
   control circuitry that receives signals on the power line path from the electronic device that are indicative of the state and that controls the status indicator of the accessory based on the received signals.

2. The accessory defined in claim 1 wherein control circuitry is configured to process the received signals to determine whether the received signals contain frequency components at any of a plurality of predefined tone frequencies.

3. The accessory defined in claim 1 wherein the status indicator of the accessory comprises a light-emitting diode status indicator and wherein the control circuitry is configured to adjust the light-emitting diode status indicator in response to detection of a frequency component in the received signals on the power line path by the control circuitry that matches a predefined tone frequency.

4. The accessory defined in claim 1 further comprising an audio connector with which the power line path supplies power to the electronic device, wherein the status indicator of the accessory comprises a light-emitting diode status indicator and wherein the control circuitry is configured to adjust the light-emitting diode status indicator to replicate the state of the status indicator on the electronic device when the control circuitry detects a frequency component in the received signals on the power line path that matches a predefined tone frequency.

5. The accessory defined in claim 1 wherein the accessory comprises a dock having a male four-contact audio connector with which the power line is coupled to the electronic device.

6. An adapter that can couple an electronic device to a host, wherein the electronic device has an audio connector to which the adapter may be connected and has a status indicator with a current state and wherein the host has a data port to which the adapter may be connected, the adapter comprising:
   a status indicator; and
   control circuitry that receives power line information from the electronic device and that uses the power line information to adjust the status indicator on the adapter to replicate the current state of the status indicator in the electronic device.

7. The adapter defined in claim 6 wherein the adapter comprises a dock adapter having a housing with a planar surface and having a male audio connector that protrudes from the planar surface and that is configured to mate with the audio connector of the electronic device.

8. The adapter defined in claim 7 wherein the male audio connector comprises a four-contact tip-ring-ring-sleeve connector.

9. The adapter defined in claim 8 further comprising a data port cable having a data port connector that is adapted to plug into the data port.

10. The adapter defined in claim 9 wherein the data port connector comprises a universal serial bus connector.

11. The adapter defined in claim 10 wherein the status indicator comprises a light-emitting diode indicator.

12. The adapter defined in claim 10 wherein the status indicator comprises two light-emitting diodes of different colors.

13. The adapter defined in claim 6 wherein the control circuitry is configured to recognize different coded tones on a positive power supply voltage line.

14. The adapter defined in claim 6 wherein the adapter comprises an audio connector that mates with the audio connector in the electronic device and wherein the adapter comprises:
- a positive power supply line coupled to a first contact in the audio connector of the adapter;
- a ground power supply line coupled to a second contact in the audio connector of the adapter; and
- a resistor in the power supply line that generates an alternating current voltage signal in response to transmitted status indicator state information tone signals from the electronic device.

15. The adapter defined in claim 6 wherein the adapter comprises an audio connector that mates with the audio connector in the electronic device and wherein the adapter comprises:
- a positive power supply line coupled to a first contact in the audio connector of the adapter; and
- a ground power supply line coupled to a second contact in the audio connector of the adapter, wherein the power line information is received by the control circuitry as alternating-current tones on the positive and ground power supply lines.

16. The adapter defined in claim 15 wherein the control circuitry is configured to identify which alternating-current tones are present in the power line information.

17. The adapter defined in claim 15 wherein the control circuitry is configured to sample signals on the positive and ground power supply lines and is configured to identify which alternating-current tones are present in the power line information by performing a discrete Fourier transform on the sampled signals.

18. The adapter defined in claim 15 wherein the control circuitry is configured to sample signals on the positive and ground power supply lines and is configured to identify which alternating-current tones are present in the power line information by applying a Goertzel algorithm that is implemented on the control circuitry to the sampled signals.

19. The adapter defined in claim 15 wherein the control circuitry comprises analog band-pass filter circuitry and is configured to identify which alternating-current tones are present in the power line information using the analog band-pass filter circuitry.

20. The adapter defined in claim 15 wherein the status indicator in the adapter comprises a light-emitting diode status indicator and wherein the control circuitry is configured to identify alternating-current tones that are present in the power line information and is configured to control the light-emitting diode status indicator based on which of the alternating-current tones are identified as being present in the power line information.

21. The adapter defined in claim 6 wherein the adapter comprises:
- a dock housing in which the control circuitry is mounted, wherein the dock housing has planar upper surface that blocks the status indicator from view when adapter is plugged into the electronic device;
- a universal serial bus cable having a universal serial bus connector that mates with the data port and having a positive power supply line and a ground power supply line coupled to the control circuitry; and
- a tip-ring-ring-sleeve audio connector protruding from the planar upper surface that mates with the audio connector of the electronic device and that is coupled to the positive power supply line and the ground power supply line, wherein the status indicator in the adapter comprises a light-emitting diode status indicator and wherein the control circuitry is configured to identify alternating-current tones that are present in the power line information by monitoring the positive and ground power supply lines and is configured to control the light-emitting diode status indicator based on which of the alternating-current tones are identified as being present in the power line information.

22. An electronic device dock that may be coupled between a computer and an electronic device, the electronic device dock comprising:
- a cable that is adapted to plug into a port on the computer;
- a male audio connector having at least a first contact that is coupled to a positive power supply line in the cable and at least a second contact that is coupled to a ground power supply line in the cable;
- a status indicator; and
- control circuitry that is coupled to the positive and ground power supply lines to detect transmitted alternating-current tones from the electronic device and that is configured to control the status indicator based on the detected transmitted alternating-current tones.

23. The electronic device dock defined in claim 22 wherein the alternating-current tones comprise tones of less than 1000 Hz in frequency.

24. The electronic device dock defined in claim 22 wherein the status indicator comprises a light-emitting diode status indicator.

25. The electronic device dock defined in claim 22 wherein the male audio connector comprises a 3.5 mm tip-ring-ring-sleeve audio connector.

26. The electronic device dock defined in claim 22 further comprising a dock housing from which the male audio connector vertically protrudes.

27. The electronic device dock defined in claim 22 further comprising a resistor coupled in the positive power line, wherein the control circuitry detects alternating-current ripple signals on the resistor from which the control circuitry extracts the alternating-current tones.

28. The electronic device dock defined in claim 27 wherein the control circuitry is configured to perform a Fourier transform on the alternating-current ripple signals to detect the transmitted alternating-current tones.

29. A media player that may be coupled to an accessory having a positive power supply voltage line and a ground power supply voltage line, the media player comprising:
- a status indicator having a state;
- an audio connector having at least first and second contacts that receives power from the positive and ground power supply lines when the media player is coupled to the adapter; and
- control circuitry that transmits a power line signal representing the state of the status indicator over the positive and ground power supply lines.

30. The media player defined in claim 29 wherein the control circuitry is configured to modulate power consumed by the status indicator to transmit the power line signal.

31. The media player defined in claim 30 wherein the status indicator comprises a light-emitting diode and wherein the control circuitry is configured to modulate the power consumed by the status indicator by driving the light-emitting diode at a frequency selected from multiple predefined tone frequencies.

* * * * *